United States Patent
Langone et al.

(10) Patent No.: US 8,947,847 B2
(45) Date of Patent: Feb. 3, 2015

(54) METHODS FOR FORMING A STRUCTURE HAVING A LIGHTNING STRIKE PROTECTION

(75) Inventors: Robert J. Langone, Clifton Park, NY (US); Robert D. Becker, Amsterdam, NY (US)

(73) Assignee: ADC Acquisition Company, Schenectady, NY (US)

( * ) Notice: Subject to any disclaimer, the term of this patent is extended or adjusted under 35 U.S.C. 154(b) by 584 days.

(21) Appl. No.: 13/298,006

(22) Filed: Nov. 16, 2011

(65) Prior Publication Data
US 2012/0063050 A1    Mar. 15, 2012

Related U.S. Application Data

(63) Continuation-in-part of application No. PCT/US2010/035243, filed on May 18, 2010.

(60) Provisional application No. 61/179,539, filed on May 19, 2009.

(51) Int. Cl.
| | |
|---|---|
| *H05F 3/00* | (2006.01) |
| *B29C 70/88* | (2006.01) |
| *B29C 70/38* | (2006.01) |
| *B64C 1/12* | (2006.01) |
| *B64D 45/02* | (2006.01) |

(52) U.S. Cl.
CPC .............. *B29C 70/885* (2013.01); *B29C 70/386* (2013.01); *B64C 1/12* (2013.01); *B64D 45/02* (2013.01); *Y02T 50/433* (2013.01); *Y02T 50/43* (2013.01)
USPC ........................................................ 361/218

(58) Field of Classification Search
USPC ........................................................ 361/218
See application file for complete search history.

(56) References Cited

U.S. PATENT DOCUMENTS

| 3,755,713 A | 8/1973 | Paszkowski |
|---|---|---|
| 6,692,681 B1 | 2/2004 | Lunde |

(Continued)

FOREIGN PATENT DOCUMENTS

| DE | 102006035847 | 2/2008 |
|---|---|---|
| EP | 2432634 B1 | 12/2013 |

(Continued)

OTHER PUBLICATIONS

Japanese Office Action and English Translation, Japanese Application Publication No. JP2012527375 (Application Serial No. 2012-511960), 7-pages, mailed Mar. 4, 2014.

(Continued)

*Primary Examiner* — Ronald W Leja
(74) *Attorney, Agent, or Firm* — Heslin Rothenberg Farley & Mesiti P.C.

(57) ABSTRACT

A method for forming a structure having lightning strike protection includes receiving at least one structural layer, receiving at least one lightning strike protection strip disposed on at least one reinforcement layer, automatically applying the at least one lightning strike protection strip disposed on the at least one reinforcement layer onto the at least one structural layer, and forming the at least one structural layer, the at least one lightning strike protection strip, and the at least one reinforcement layer, into the structure. The at least one lightning strike protection strip comprises a first material, and the at least one reinforcement layer comprises a second material different from the first material. The automatically applying may include using at least one of fiber placement equipment, tape laying equipment, and similar automated equipment.

22 Claims, 10 Drawing Sheets

(56) References Cited

U.S. PATENT DOCUMENTS

| | | | |
|---|---|---|---|
| 7,063,118 B2 | 6/2006 | Hauber et al. | |
| 8,206,823 B2 | 6/2012 | Schaaf et al. | |
| 8,312,827 B1 * | 11/2012 | Free | 112/475.08 |
| 8,709,189 B2 | 4/2014 | Schaaf et al. | |
| 2005/0041362 A1 | 2/2005 | Hall | |
| 2006/0143920 A1 * | 7/2006 | Morrison et al. | 29/896.6 |
| 2007/0141927 A1 | 6/2007 | Brown | |
| 2009/0258220 A1 | 10/2009 | Schaaf et al. | |
| 2012/0145319 A1 | 6/2012 | Schaaf et al. | |

FOREIGN PATENT DOCUMENTS

| | | |
|---|---|---|
| GB | 2433467 | 6/2007 |
| JP | 2012527375 | 5/2010 |
| JP | 2011524265 | 9/2011 |
| WO | 2008015082 | 2/2008 |
| WO | 2009/128991 | 10/2009 |
| WO | 2010135318 | 11/2011 |

OTHER PUBLICATIONS

International Search Report; International Application No. PCT/US2010/035243 (WO 20100135318), dated Dec. 2, 2010, 4 pages.

Written Opinion of International Searching Authority; International Application No. PCT/US2010/035243 (WO 20100135318), dated Dec. 2, 2010, 5 pages.

International Preliminary Report on Patentability; International Application No. PCT/US2010/035243 (WO 20100135318), dated Aug. 9, 2011, 8 pages.

* cited by examiner

METHODS FOR FORMING A STRUCTURE HAVING A LIGHTNING STRIKE PROTECTION

CROSS-REFERENCE TO RELATED APPLICATION

This application is a continuation-in-part application of PCT International Application No. PCT/US2010/035243, filed on May 18, 2010, entitled "Methods For Forming A Structure Having A Lighting Strike Protection", and which published in English on Nov. 25, 2010, as WO 2010/135318, which application claims the benefit of U.S. Provisional Application No. 61/179,539, filed May 19, 2009, entitled "Methods For Forming A Structure Having A Lightning Strike Protection", and which applications are hereby incorporated herein by reference in their entirety.

FIELD OF THE INVENTION

This invention relates generally to lightning strike protection for structures, and more particularly to methods for automatically applying lightning strike protection during the forming of structures such as composite structures.

BACKGROUND OF THE INVENTION

The extremely high energy of a lightning strike can cause damage to structures unless adequate protection is provided. Composite structures are particularly vulnerable due to the relatively low electrical conductivity compared to metals. Composite materials are frequently used in aeronautical and aerospace applications due to their high strength to weight ratio and desirably are protected from damage due to lightning strikes.

Traditionally, composite structures were fabricated using hand layup with a conductive layer added manually for lightning strike protection. In order to minimize weight, the lightning strike protection is very lightweight and extremely fragile. Automated methods such as fiber placement and tape laying machines are currently used to automatically fabricate composite structures, however the fragile lightning strike protection is still applied manually.

Lightning protection for composite structures, includes for example, U.S. Pat. No. 3,755,713 issued to Paszkowski, which discloses a metal wire mesh imbedded into a composite structure for lightning strike protection. The metal mesh, foil and/or wires are imbedded into the structure using a manual process.

U.S. Pat. No. 6,692,681 issued to Lunde discloses a method and apparatus for manufacturing composite structures such as an aircraft fuselage. Following fiber-placement of the outer carbon fiber skin, other layers may be manually placed. For example, a fabric layer containing metal filaments for lightning protection may be manually applied.

There is a need for further lightning strike protection for structures, and more particularly to methods for automatically applying lightning strike protection during the forming of structures such as composite structures.

SUMMARY OF THE INVENTION

In a first aspect, the present invention provides a method for forming a structure having lightning strike protection. The method includes receiving at least one structural layer, and receiving at least one lightning strike protection strip disposed on at least one reinforcement layer comprising a unidirectional fiber reinforced composite tape. The at least one lightning strike protection strip comprises a first material, and the at least one reinforcement layer comprises a second material different from the first material. Using at least one of a fiber placement apparatus, a tape laying apparatus, and a similar automated manufacturing means, the at least one lightning strike protection strip disposed on the at least one reinforcement layer onto the at least one structural layer is automatically applied. The at least one reinforcement layer supports the at least one lightning strike protection strip and ensures that tensile stresses are borne by the at least one reinforcement layer to minimize stresses on the at least one lightning strike protection strip during the automatically applying of the at least one lightning strike protection strip disposed on the at least one reinforcement layer to avoid damage to the at least one lightning strike protection strip. The at least one structural layer, the at least one lightning strike protection strip, and the at least one reinforcement layer, are formed into the structure.

In a second aspect, the present invention provides a lightning strike protection means for use in automatically forming a structure having lightning strike protection. The lightning strike protection means includes a reinforcement layer comprising a unidirectional fiber reinforced composite tape, and a lightning strike protection strip disposed on the reinforcement layer. The lightning strike protection strip comprises a first material, and the reinforcement layer comprises a second material different from the first material. The reinforcement layer and the lightning strike protection strip are operable to being automatically applied using at least one of a fiber placement apparatus, a tape laying apparatus, and similar automated manufacturing means, and the reinforcement layer supports the lightning strike protection strip and ensures that tensile stresses are borne by the reinforcement layer to minimize stresses on the lightning strike protection strip during the automatically applying of the lightning strike protection strip disposed on the reinforcement layer and to avoid damage to the lightning strike protection strip. The reinforcement layer forms a portion of the structure.

In a third aspect, the present invention provides a method for forming a structure having lightning strike protection. The method includes receiving at least one structural layer, and receiving at least one lightning strike protection strip disposed on at least one reinforcement layer. The at least one lightning strike protection strip comprises a first material, and the at least one reinforcement layer comprises a second material different from the first material. The at least one lightning strike protection strip disposed on the at least one reinforcement layer is automatically applied onto the at least one structural layer. A surfacing layer is separately applied over the lightning strike protection strip disposed on the at least one reinforcement layer disposed on the at least one structural layer, and the at least one structural layer, the at least one lightning strike protection strip, the reinforcement layer, and the surfacing layer are formed into the structure.

In a fourth aspect, the present invention provides a structure formed using the above-described method and/or lightning strike protection strip.

BRIEF DESCRIPTION OF THE DRAWINGS

The subject matter which is regarded as the invention is particularly pointed out and distinctly claimed in the concluding portion of the specification. The invention, however, may best be understood by reference to the following detailed description of various embodiments and the accompanying drawings in which:

DETAILED DESCRIPTION OF THE INVENTION

The present invention is directed to lightning strike protection of structures such as composite structures and especially for fiber placed or tape laid composite structures. Aeronautical and aerospace structures are especially applicable since the high performance structures (such as but not limited to helicopters, airplanes, UAVs and missiles) are currently fabricated using fiber placement, tape laying technologies and other automated fabrication means.

As used herein, the following terms are defined as follows:

Lightning strike protection strip: Any layer or layers of electrically conductive materials applied to any structure for the purpose of dissipating the electrical energy of a lightning strike. Such layer or layers may consist of metal foil, expanded foil, wire mesh, wires, conductive fibers, nanotubes, conductive plastics, conductive fillers in a matrix, or any other suitable material or configuration.

Tape laying: A fabrication process in which wide prepreg tape is laid side by side or overlapped to form a relatively flat structure.

Automated fiber placement: Automated Fiber Placement (AFP) is traditionally differentiated from tape laying by considering the process to utilize a plethora of narrow, individual slit tapes or tows to make up a given total prepreg band width. Complex geometries that demand complex fiber placement are typically approached by the industry with multiple 0.125 inch-0.250 inch tows or tapes.

Thermoplastic: A plastic material that is capable of being repeatedly softened by application of heat and repeatedly hardened by cooling. Softening and hardening are reversible for a thermoplastic.

Thermoset: A plastic material that is capable of being cured by heat or catalyst into an infusible and insoluble material. Once cured, a thermoset cannot be returned to the uncured state. Thus, hardening is irreversible for a thermoset.

Aspects of the present invention are directed to methods for applying lightning strike protection to any surface including, but not limited to, composite structures. For example, a composite structure may be formed from a plurality of layers. The composite may comprise a matrix material such as a binder or resin, and comprise a reinforcing material such as a plurality of fibers or other structures formed from graphite, fiberglass, aramid, or other materials. The matrix material such as a thermoplastic or thermoset material surrounds and supports the reinforcing material by maintaining their relative positions. The layers may be in the form of a tape having a large width relative to the thickness of the tape. For example, the composite tape may have a width of about 1 inch to about 12 inches, and preferably about 1 inch for complex structures inches, and about 6 inches or about 12 inches for generally flat surfaces of structures.

The technique of the present invention employs conventional automated fiber placement equipment, tape laying equipment, or other equipment or apparatus to place the lightning strike protection in the same manner as the other layers in the underlying composite structure. In so doing, a manufacturer may be able to extend the use of existing equipment, improve the final product, and improve manufacturing efficiency.

Figure 1:
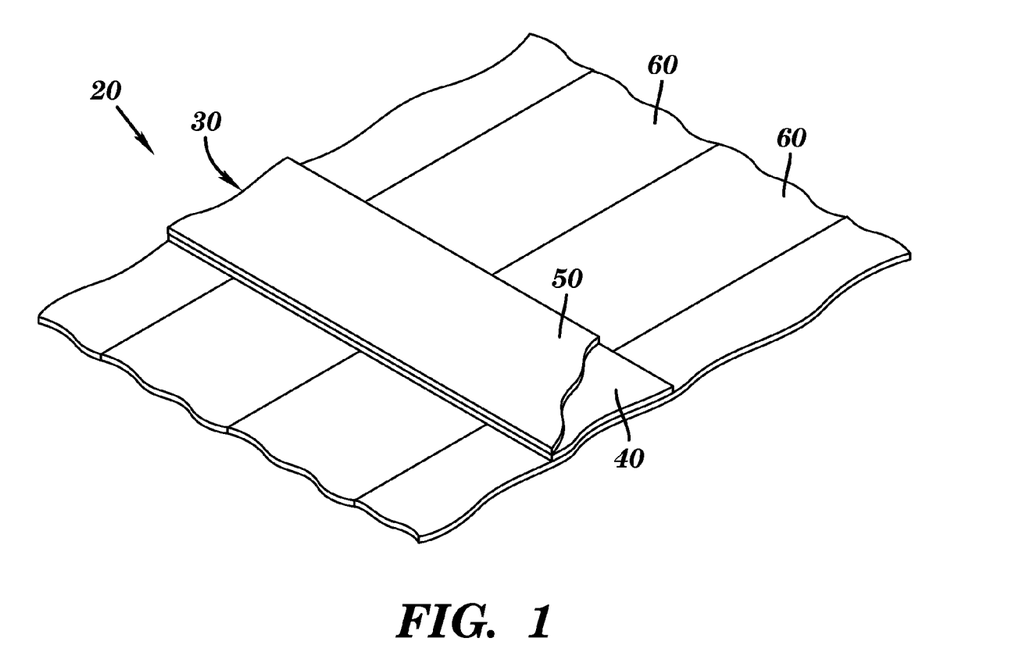
FIG. 1 is a perspective view of one embodiment of a composite structure having lightning strike protection means in accordance with one aspect of the present invention.

FIG. 1 is a perspective view of one embodiment of a structure 20 such as a composite structure in accordance with one aspect of the present invention. Structure 20 includes a lightning strike protection means 30 comprising a lightning strike protection strip 50 disposed on at least one reinforcement layer 40 which is disposed on at least one structural layer 60.

Figure 2:
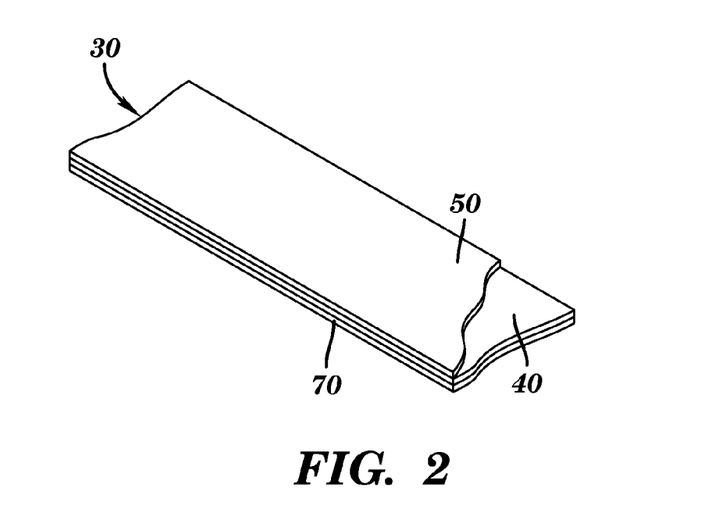
FIG. 2 is a perspective view of the lightning strike protection means of FIG. 1 disposed on a release or backing sheet.

FIG. 2 is a perspective view of one embodiment of lightning strike protection means 30 disposed on a release or backing sheet 70 prior to lightning strike protection means 30 being removed from backing sheet 70 and disposed on structural layers 60 (FIG. 1) such as being automatically deposited.

Figure 3:
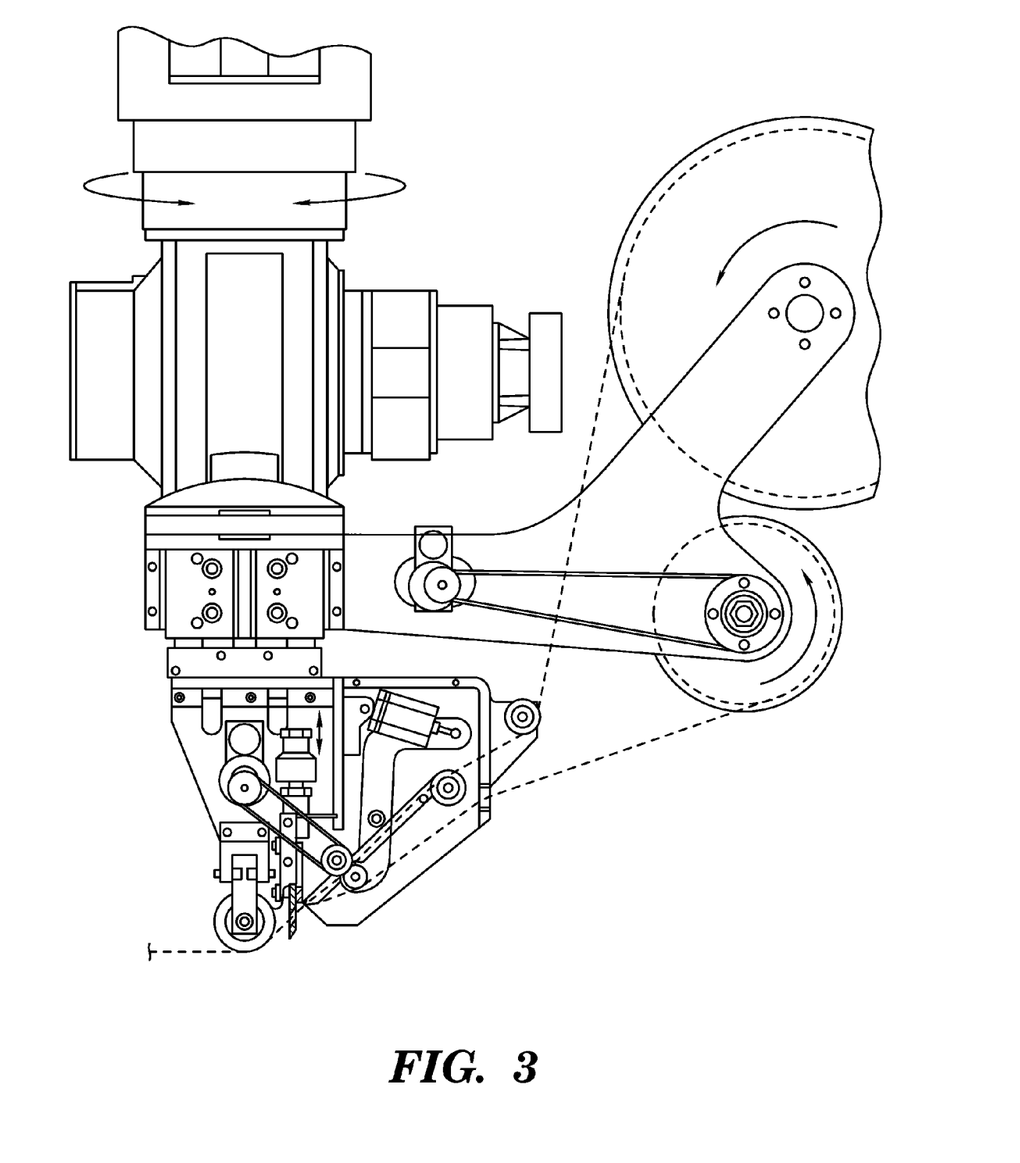
FIG. 3 is a schematic side elevational view of one embodiment of a tape laying apparatus for automatically forming the composite structure with the lightning strike protection means of FIG. 1.

For example, with reference to FIG. 3, one aspect of the present invention may be implemented on a fully automated apparatus 10 to laminate various structural articles with a layer of resin impregnated fiber tape. The apparatus may remove a releasable backing layer from the tape or structural layers being employed, then deposit the unbacked tape on the surface of the structural article, and finally sever the end of the tape being deposited. An automated cut and restart procedure may be employed to increase tape throughput. Such a fully automated apparatus is described in U.S. Pat. No. 7,063,118 issued to Hauber et al., the entire subject matter of the patent being incorporated herein by reference. It will be appreciated by those skilled in the art that the technique of the present invention may be implemented on other suitable automated fiber placement equipment, automated tape laying equipment, and similar automated placement means.

With reference again to FIGS. 1 and 2, in accordance with one aspect of the present invention, the reinforcement layer is applied to the lightning strike protection strip to support the lightning strike protection strip during the fiber placement, tape laying or other suitable process. The reinforcement layer may be unidirectional, cross-ply, woven, non-woven or other geometries that has sufficient strength/stiffness to ensure that tensile stresses are borne by the reinforcing layer to minimize the stresses applied to the relatively fragile lightning strike protection. The reinforcement layer may also comprise any suitable material such as graphite, fiberglass, aramid, linear polyolefin, ceramic, metal, etc. in any suitable length so long as its addition results in an increased tensile strength and/or stiffness of the lightning strike protection strip. For example, the reinforcement layer may have a width of about 1 inch to about 12 inches, and preferably about 1 inch for complex structures inches, and about 6 inches or about 12 inches for generally flat surfaces of structures. The lightning strike protection strip may have the same width as the reinforcement layer or may be wider or narrower as described below for forming gaps between adjacent lightning strike protection strips or overlapping of the lightning strike protection strips.

For example, the lightning strike protection strip may comprise a first material such as a metal and the reinforcement layer may comprise a second material such as a composite material comprising fibers and a matrix. The structure or structural layer may comprise a third material and the second material of the reinforcement layer may be the same as the third material. For example, the reinforcement layer may be the same material as the underlying structure, e.g., a composite material.

The reinforcement layer may be bonded or unbonded to the lightning strike protection prior to fiber placement. Preferably, but not necessarily, the reinforcement layer is bonded to the lightning strike protection using the same adhesive as is used for the remainder of the structure. For example, a thermosetting epoxy adhesive may be used in the case of an epoxy composite laminate and a thermoplastic adhesive may be used in the case of a thermoplastic composite laminate, etc. This may ensure a cohesive bond between the various layers of the structure.

In one embodiment, a lightning strike protection strip may have a thickness of about 0.0035 inch, and the reinforcement layer may have thickness of about 0.005 inch. For example, a lightning strike protection strip may comprise an expanded copper metal foil 0.0035 inch thick, and the reinforcement layer may be a 0.005 inch thick graphite fiber reinforced PEEK composite tape. From the present description, it will be appreciated that other materials and thicknesses may be suitably employed.

Some aspects of the present invention may solve the problem of forming a conductive pathway to dissipate the energy of a lightning strike in a structure, for example, by placing the edges of the strips of lightning strike material adjacent to each other to optimize electrical conduction between the adjacent layers.

Figure 4:
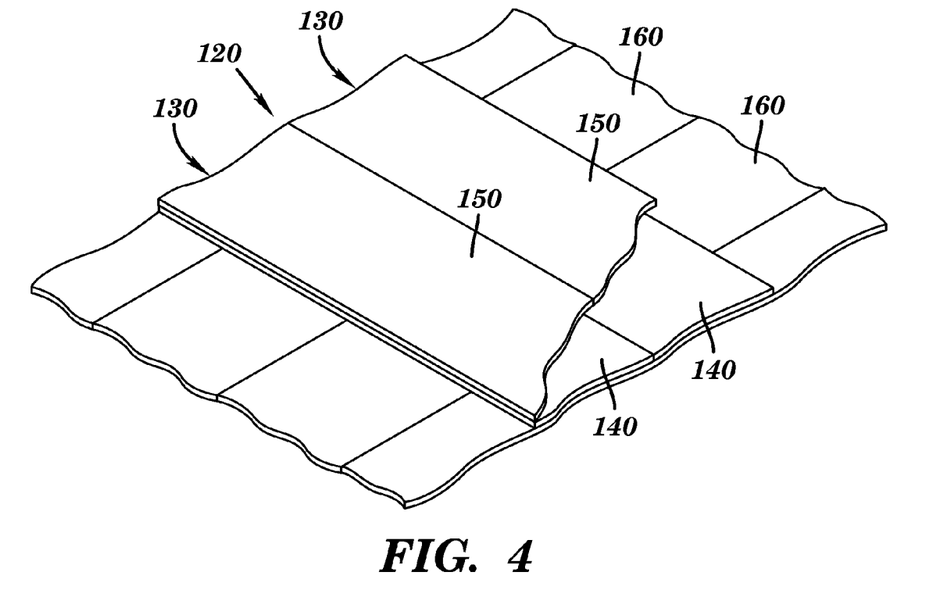
FIG. 4 is a perspective view of another embodiment of a composite structure in accordance with another aspect of the present invention having lightning strike protection means in which a portion of adjacent lightning strike protection strips overlap.

Such placement of adjacent strips may include overlapping lightning strike protection strip to improve electrical conduction. For example, as shown in FIG. 4, a structure 120 may include a portion of a lightning strike protection strip 150 which is wider than a reinforcement layer 140 such that lightning strike protection strip 150 overlaps that of a portion of an adjacent lightning strike protection strip 150 to improve electrical conduction between adjacent strips. Such conduction may be further optimized by the selective application of other materials such as, but not limited to, conductive carbon filaments, nanotubes, conductive fillers or any other suitable means.

Figure 5:
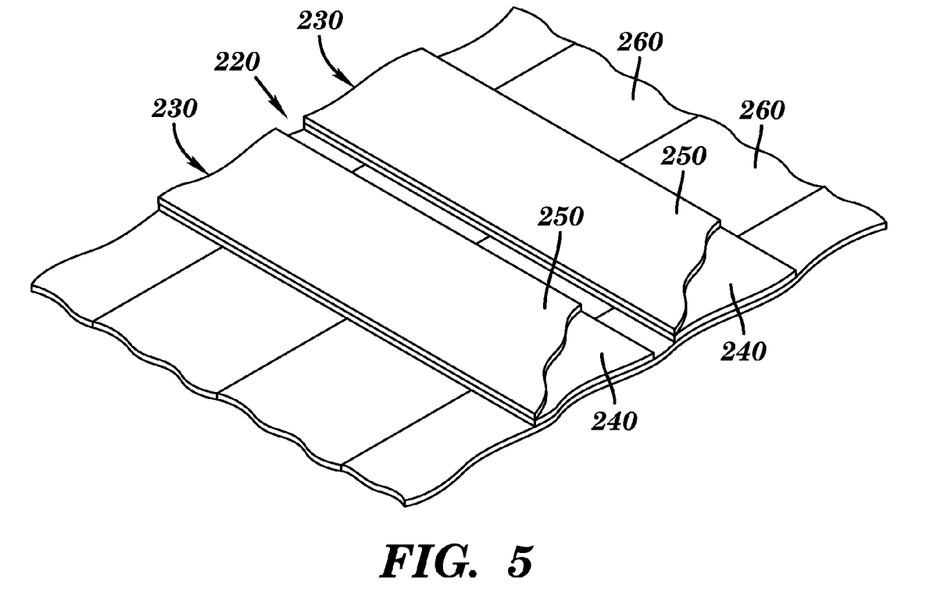
FIG. 5 is a perspective view of another embodiment of a composite structure in accordance with another aspect of the present invention having lightning strike protection means in which portions of adjacent lightning strike protection strips are spaced apart to define a gap.

Such placement of adjacent strips may include a controlled gap to dissipate energy across the structure in selected directions. For example, as shown in FIG. 5, a structure 220 may include a portion of a lightning strike protection strip 250 spaced-apart from a portion of an adjacent lightning strike protection strip 250 such that a gap is formed therebetween to dissipate energy across the structure. In addition, a controlled overlapping and spacing apart of adjacent strips may be employed to tailor the conduction and dissipation of energy across the structure.

Figure 6:
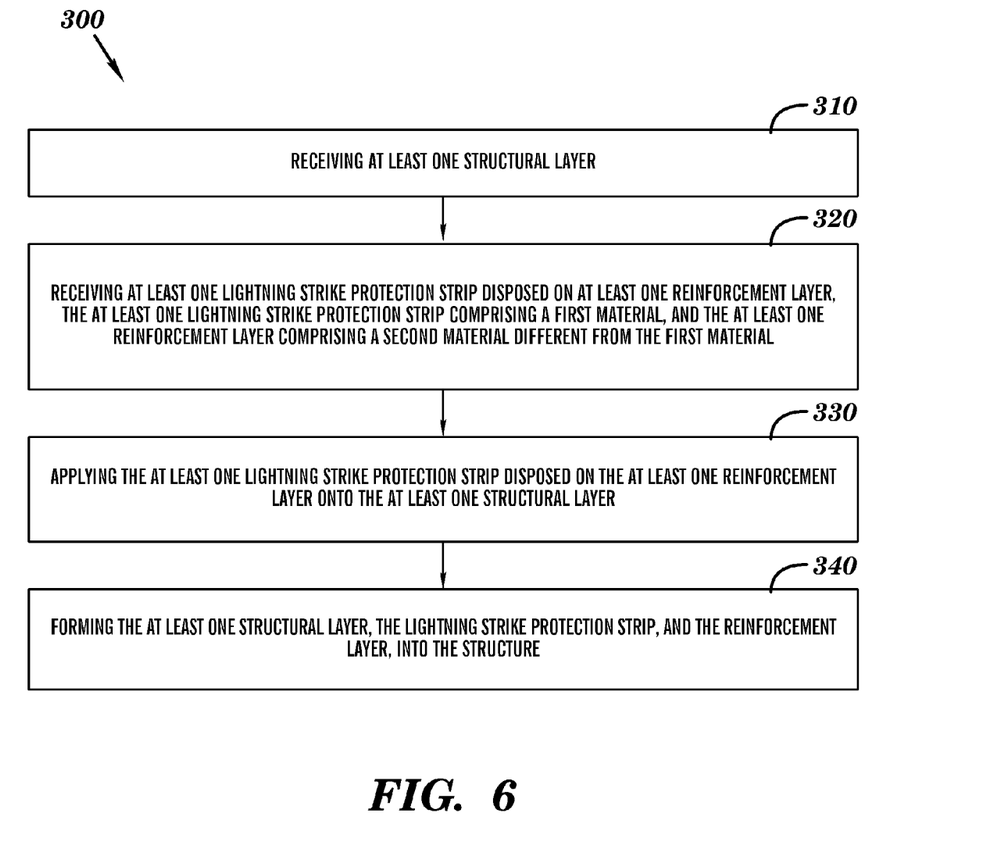
FIG. 6 is a flowchart of one embodiment of a method for forming a structure having lightning strike protection in accordance with one aspect of the present invention.

FIG. 6 is a flowchart of one embodiment of a method 300 for forming a structure having lightning strike protection in accordance with one aspect of the present invention. The method may include at 310, receiving at least one structural layer, and at 320, receiving at least one lightning strike protection strip disposed on at least one reinforcement layer. The at least one lightning strike protection strip comprises a first material, and the at least one reinforcement layer comprises a second material different from the first material. At 330, the at least one lightning strike protection strip disposed on the at least one reinforcement layer is applied onto the at least one structural layer, and at 340, the at least one structural layer, the lightning strike protection strip, and the reinforcement layer, are formed into the structure.

Figure 7:
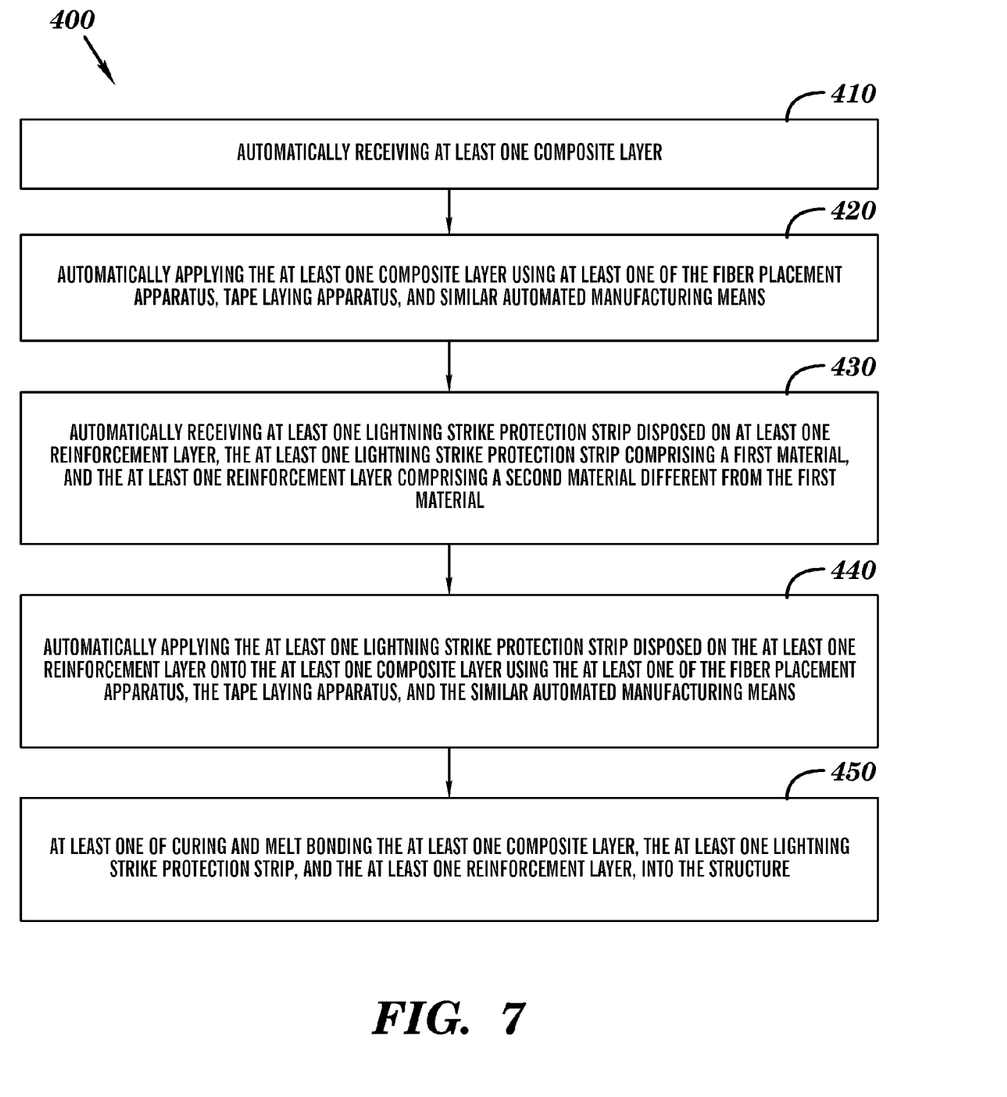
FIG. 7 is a flowchart of another embodiment of a method for automatically forming a composite structure having lightning strike protection using at least one of a fiber placement apparatus, a tape laying apparatus, and a similar automated manufacturing means in accordance with one aspect of the present invention.

FIG. 7 is a flowchart of another embodiment of a method 400 for automatically forming a composite structure having lightning strike protection using at least one of a fiber placement apparatus, a tape laying apparatus, and a similar automated manufacturing means in accordance with one aspect of the present invention. The method may include at 410, automatically receiving at least one composite layer, and 420, automatically applying the at least one composite layer using at least one of the fiber placement apparatus, tape laying apparatus, and similar automated manufacturing means. At 430, at least one lightning strike protection strip disposed on at least one reinforcement layer is automatically received. The at least one lightning strike protection strip comprises a first material, and the at least one reinforcement layer comprises a second material different from the first material. At 440, the at least one lightning strike protection strip disposed on the at least one reinforcement layer is automatically disposed onto the at least one composite layer using the at least one of the fiber placement apparatus, the tape laying apparatus, and the similar automated manufacturing means. At 450, the at least one composite layer, the at least one lightning strike protection strip, and the at least one reinforcement layer, are at least one of cured and melt bonded into the structure.

Figure 8:
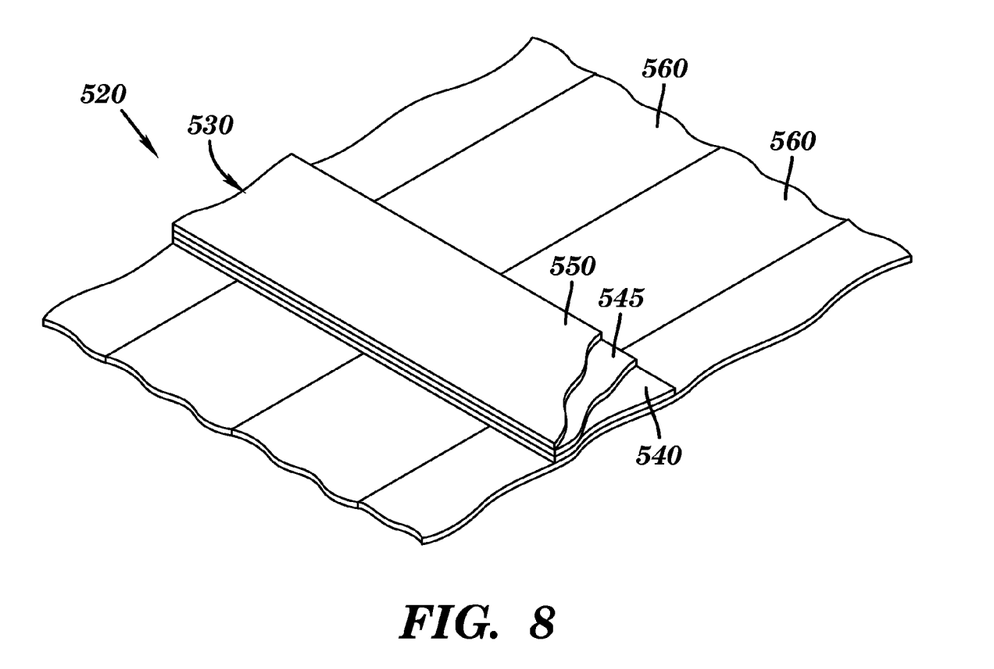
FIG. 8 is a perspective view of another embodiment of a composite structure having lightning strike protection means in accordance with an aspect of the present invention.

FIG. 8 is a perspective view of another embodiment of a structure 520 such as a composite structure in accordance with an aspect of the present invention. Structure 520 generally includes a lightning strike protection means 530 and at least one structural layer 560. In this illustrated embodiment, lightning strike protection means 530 may comprise a lightning strike protection strip 550 disposed on at least one reinforcement layer 540, and further comprise an isolation layer 545 disposed between lightning strike protection means 530 and at least one reinforcement layer 540. Isolation layer 545 may further aid in the lightning strike protection strip providing a conductive pathway to dissipate the energy of a lightning strike in the structure.

Figure 9:
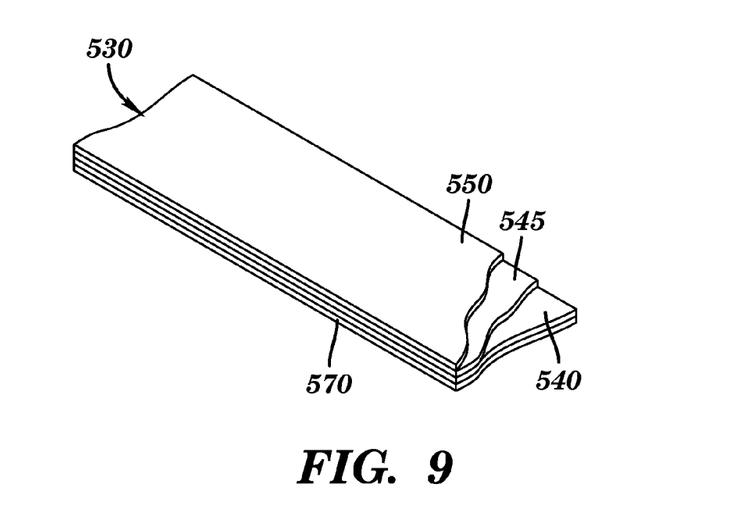
FIG. 9 is a perspective view of the lightning strike protection means of FIG. 8 disposed on a release or backing sheet.

FIG. 9 is a perspective view of one embodiment of lightning strike protection means 530 disposed on a release or backing sheet 570 prior to lightning strike protection means 530 being removed from backing sheet 570 and disposed on structural layers 560 (FIG. 1) such as being automatically deposited.

For example, with reference again to FIG. 3, an aspect of the present invention may be implemented on a fully automated apparatus 10 to laminate various structural articles with a layer of resin impregnated fiber tape. The apparatus may remove a releasable backing layer from the tape or structural layers being employed (including lightning strike protection strip 550), then deposit the unbacked tape on the surface of the structural article, and finally sever the end of the tape being deposited. An automated cut and restart procedure may be employed to increase tape throughput. Such a fully automated apparatus is described in U.S. Pat. No. 7,063,118 issued to Hauber et al., the entire subject matter of the patent being incorporated herein by reference. It will be appreciated by those skilled in the art that the technique of the present invention may be implemented on other suitable automated fiber placement equipment, automated tape laying equipment, and similar automated placement means.

With reference again to FIGS. 8 and 9, in accordance with one aspect of the present invention, reinforcement layer 540 is applied to the lightning strike protection strip to support the lightning strike protection strip during the fiber placement, tape laying or other suitable process. The reinforcement layer 540 may be unidirectional, cross-ply, woven, non-woven or other geometries that has sufficient strength/stiffness to ensure that tensile stresses are borne by the reinforcing layer to minimize the stresses applied to the relatively fragile lightning strike protection. The reinforcement layer may also comprise any suitable material such as graphite, fiberglass, aramid, linear polyolefin, ceramic, metal, etc. in any suitable length so long as its addition results in an increased tensile strength and/or stiffness of the lightning strike protection strip. For example, the reinforcement layer may have a width of about 1 inch to about 12 inches, and preferably about 1 inch for complex structures inches, and about 6 inches or about 12 inches for generally flat surfaces of structures. The lightning strike protection strip may have the same width as the reinforcement layer or may be wider or narrower as described below for forming gaps between adjacent lightning strike protection strips or overlapping of the lightning strike protection strips.

For example, lightning strike protection strip 550 may comprise a first material such as a metal and reinforcement layer 540 may comprise a second material such as a composite material comprising fibers and a matrix. The structure or structural layer 560 may comprise a third material and the second material of the reinforcement layer may be the same as the third material. For example, the reinforcement layer may be the same material as the underlying structure, e.g., a composite material.

Isolation layer 545 may include a suitable nonconductive material such as fiberglass, aramid, linear polyolefin, ceramic, or other nonconductive material, and may include a matrix material such as a binder or resin. The matrix material may be a thermoplastic or thermoset material that surrounds and supports the nonconductive material by maintaining their relative positions. The nonconductive material may be in the form of a unidirectional, cross-ply, woven, non-woven or other geometries.

The isolation layer may be bonded or unbonded to the lightning strike protection strip and to the reinforcement layer prior to fiber placement. Preferably, but not necessarily, the isolation layer is bonded to the lightning strike protection strip and to the reinforcement layer using the same adhesive as is used for the remainder of the structure. For example, a thermosetting epoxy adhesive may be used in the case of an epoxy composite laminate and a thermoplastic adhesive may be used in the case of a thermoplastic composite laminate, etc. This may ensure a cohesive bond between the various layers of the structure.

In one embodiment, a lightning strike protection strip may have a thickness of about 0.0035 inch, and the reinforcement layer may have thickness of about 0.005 inch. For example, a lightning strike protection strip may comprise an expanded copper metal foil 0.0035 inch thick, and the reinforcement layer may be a 0.005 inch thick graphite fiber reinforced PEEK composite tape. The isolation layer may have a thickness of about 0.010 inch, and comprise an electrically insulating material such as noted above. From the present description, it will be appreciated that other materials and thicknesses may be suitably employed.

Figure 10:
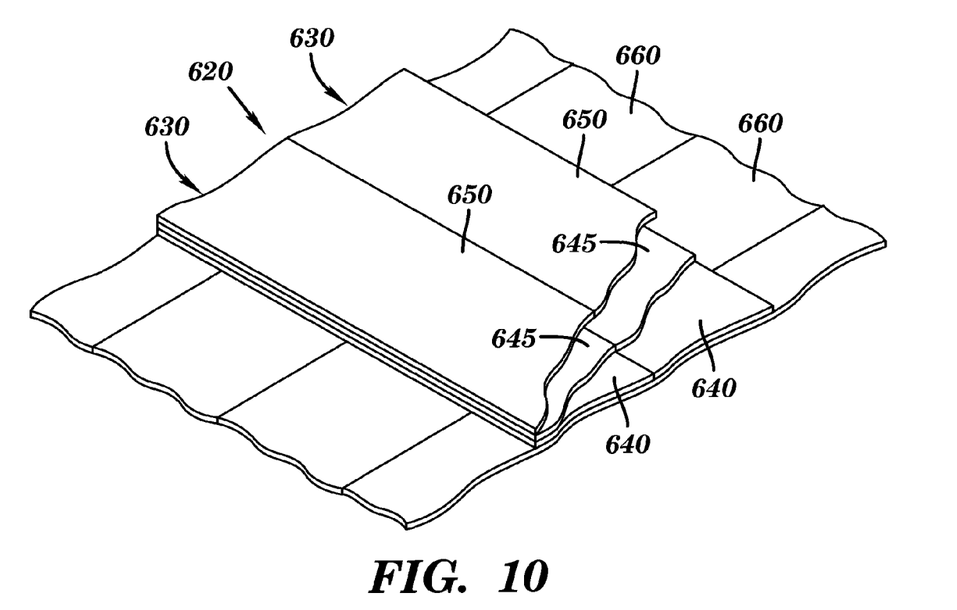
FIG. 10 is a perspective view of another embodiment of a composite structure in accordance with another aspect of the present invention having lightning strike protection means in which a portion of adjacent lightning strike protection strips overlap.

Placing the edges of the strips of lightning strike material adjacent to each other may optimize electrical conduction between the adjacent layers, e.g., forming a conductive pathway to dissipate the energy of a lightning strike in a structure. Such placement of adjacent strips may include overlapping lightning strike protection strip to improve electrical conduction. For example, as shown in FIG. 10, a structure 620 may include a portion of a lightning strike protection strip 650 which is wider than a reinforcement layer 640 and isolation layer 645 such that lightning strike protection strip 650 overlaps that of a portion of an adjacent lightning strike protection strip 650 to improve electrical conduction between adjacent strips. Such conduction may be further optimized by the selective application of other materials such as, but not limited to, conductive carbon filaments, nanotubes, conductive fillers or any other suitable means.

Figure 11:
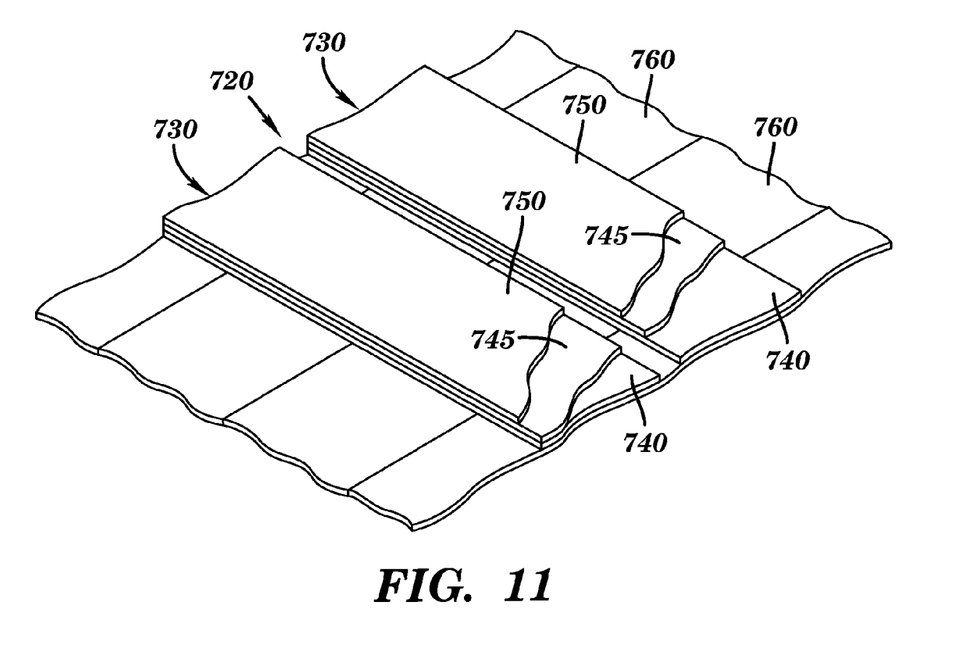
FIG. 11 is a perspective view of another embodiment of a composite structure in accordance with another aspect of the present invention having lightning strike protection means in which portions of adjacent lightning strike protection strips are spaced apart to define a gap.

Such placement of adjacent strips may include a controlled gap to dissipate energy across the structure in selected directions. For example, as shown in FIG. 11, a structure 720 may include a portion of a lightning strike protection strip 750 spaced-apart from a portion of an adjacent lightning strike protection strip 750 such that a gap is formed therebetween to dissipate energy across the structure. In addition, a controlled overlapping and spacing apart of adjacent strip may be employed to tailor the conduction and dissipation of energy across the structure. In addition, a controlled overlapping and spacing apart of adjacent strips may be employed to tailor the conduction and dissipation of energy across the structure.

Figure 12:
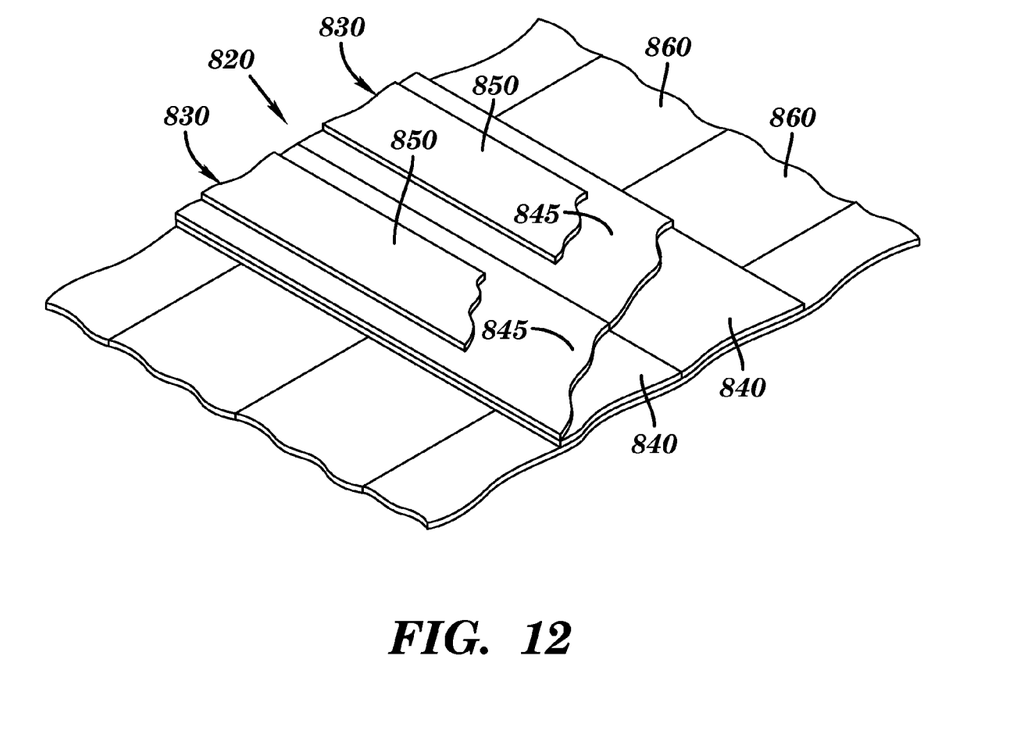
FIG. 12 is a perspective view of another embodiment of a composite structure in accordance with another aspect of the present invention having a gap disposed between adjacent lightning strike protection strips.

In another example, as shown in FIG. 12, a structure 820 may include a portion of a lightning strike protection strip 850 spaced-apart from a portion of an adjacent lightning strike protection strip 850 such that a gap is formed therebetween to dissipate energy across the structure. Lightning strike protection strips 850 may be sized narrower than reinforcement layers 840 and isolation layers 845 so that when edges of reinforcement layers 840 and isolation layers 845 are abutted against each other, edges of lightning strike protection strips 850 form a gap therebetween.

Figure 13:
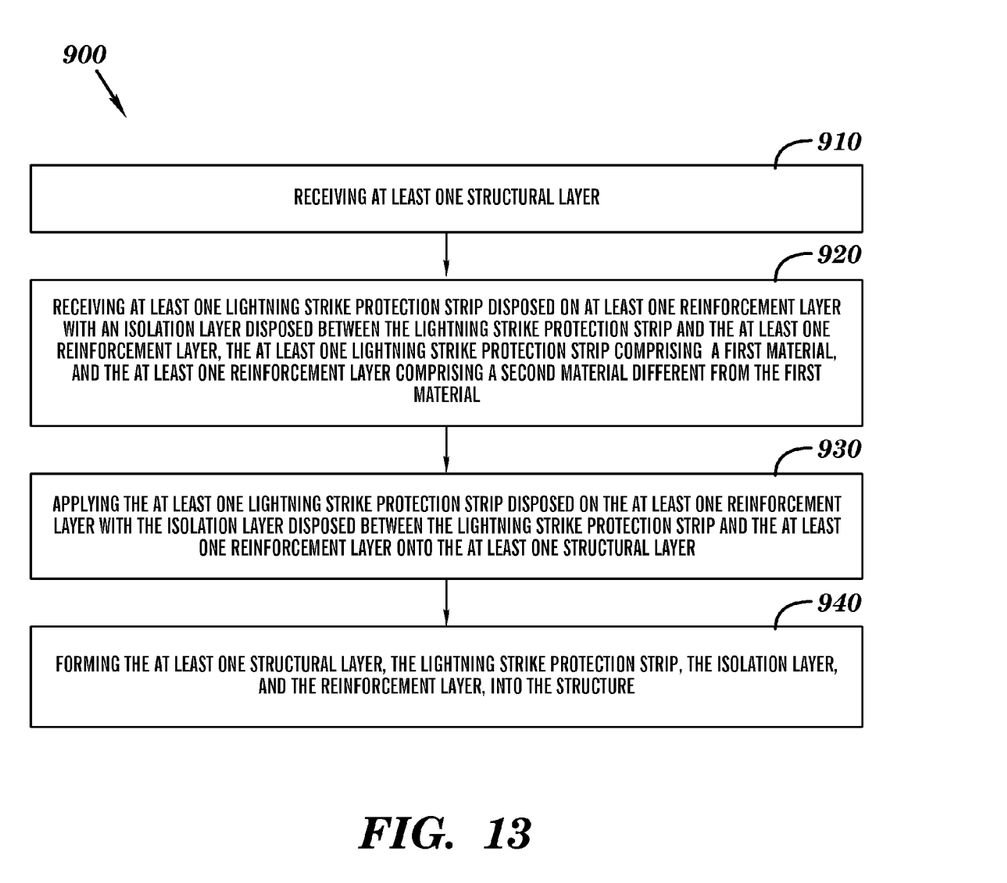
FIG. 13 is a flowchart of another embodiment of a method for forming a structure having lightning strike protection in accordance with an aspect of the present invention.

FIG. 13 is a flowchart of one embodiment of a method 900 for forming a structure having lightning strike protection in accordance with an aspect of the present invention. The method may include at 910, receiving at least one structural layer, and at 920, receiving at least one lightning strike protection strip disposed on at least one reinforcement layer with an isolation layer disposed between the at least one lightning strike protection strip and the at least one reinforcement layer. The at least one lightning strike protection strip comprises a first material, and the at least one reinforcement layer comprises a second material different from the first material. At 930, the at least one lightning strike protection strip disposed on the at least one reinforcement layer with the isolation layer disposed between the at least one lightning strike protection strip and the at least one reinforcement layer is applied onto the at least one structural layer, and at 940, the at least one structural layer, the at least lightning strike protection strip, the isolation layer, and the at least one reinforcement layer, are formed into the structure.

Figure 14:
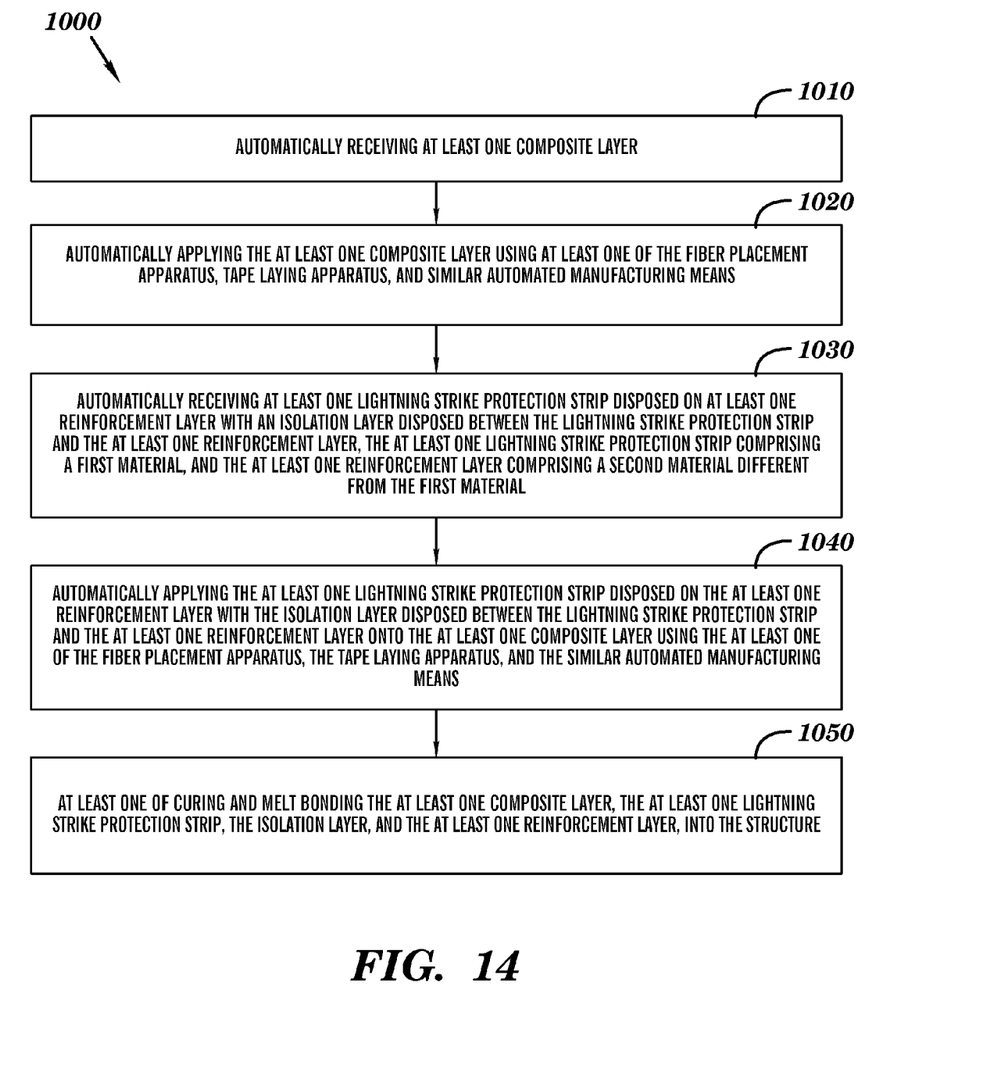
FIG. 14 is a flowchart of another embodiment of a method for automatically forming a composite structure having lightning strike protection using at least one of a fiber placement apparatus, a tape laying apparatus, and a similar automated manufacturing means in accordance with an aspect of the present invention.

FIG. 14 is a flowchart of another embodiment of a method 1000 for automatically forming a composite structure having lightning strike protection using at least one of a fiber placement apparatus, a tape laying apparatus, and a similar automated manufacturing means in accordance with one aspect of the present invention. The method may include at 1010, automatically receiving at least one composite layer, and 1020, automatically applying the at least one composite layer using at least one of the fiber placement apparatus, tape laying apparatus, and similar automated manufacturing means. At 1030, at least one lightning strike protection strip disposed on at least one reinforcement layer with an isolation layer disposed between the at least one lightning strike protection strip and the at least one reinforcement layer is automatically received. The at least one lightning strike protection strip comprises a first material, and the at least one reinforcement layer comprises a second material different from the first material. At 1040, the at least one lightning strike protection strip disposed on the at least one reinforcement layer with the isolation layer disposed between the at least one lightning strike protection strip and the at least one reinforcement layer is automatically disposed onto the at least one composite layer using the at least one of the fiber placement apparatus, the tape laying apparatus, and the similar automated manufacturing means. At 1050, the at least one composite layer, the at least one lightning strike protection strip, the isolation layer, and the at least one reinforcement layer, are at least one of cured and melt bonded into the structure.

A further aspect of the present invention may include providing a smooth surface finish to the lightning strike protection. As the lightning strike protection is disposed on or near the outer surface of the structure, it may be desirably that the lightning strike protection has a smooth surface finish. For example, the lightning strike protection strip may be embedded into a matrix material, a surface veil applied over the lightning strike protection, and the lightning strike protection may be traversed with a subsequent smoothing pass or passes with the fiber placement, tape placement or other manufacturing equipment to improve surface finish alone or in combination with other processes as known by those skilled in the art for achieving a smooth outer surface.

In another example, a support layer may be applied over the lightning strike protection strip to provide a sacrificial surfacing layer without disturbing the lightning strike protection, to provide electrical continuity, and to provide improved surface finish and the ability for subsequent machining steps to provide a smooth surface finish and accurate outside dimensions. Such external sacrificial layer may be applied as one, two or more layers of different materials or the same material with different colors so that subsequent machining steps will visibly show when one layer has been breached and before the lightning strike protection has been damaged.

Fiber placement and tape laying machinery or the like are intended to place relatively strong composite fibers and not designed to solely place relatively fragile lightning strike protection to the structure. The present invention solves the problem of damage to the lightning strike means during automated manufacture by adding a reinforcement layer to the lightning strike protection to support the lightning strike protection during fiber placement, tape laying or other suitable process. By employing a reinforcement layer, the fragile lightning strike protection may be readily applied to a structure whether simple or complex geometry using the fiber placement and tape laying machinery or the like.

Although the invention has been particularly shown and described with reference to certain preferred embodiments, it will be readily appreciated by those of ordinary skill in the art that various changes and modifications may be made therein, without departing from the spirit and scope of the invention.

The invention claimed is:

1. A method for forming a structure having lightning strike protection, the method comprising:
   receiving at least one structural layer;
   receiving at least one lightning strike protection strip disposed on at least one reinforcement layer comprising a unidirectional fiber reinforced composite tape, the at least one lightning strike protection strip comprising a first material, and the at least one reinforcement layer comprising a second material different from the first material;
   automatically applying, using at least one of a fiber placement apparatus, a tape laying apparatus, and a similar automated manufacturing means, the at least one lightning strike protection strip disposed on the at least one reinforcement layer onto the at least one structural layer, the at least one reinforcement layer supporting the at least one lightning strike protection strip and ensuring that tensile stresses are borne by the at least one reinforcement layer to minimize stresses on the at least one lightning strike protection strip during the automatically applying of the at least one lightning strike protection strip disposed on the at least one reinforcement layer to avoid damage to the at least one lightning strike protection strip; and
   forming the at least one structural layer, the at least one lightning strike protection strip, and the at least one reinforcement layer, into the structure.

2. The method of claim 1 wherein the at least one structural layer comprises a third material and the second material of the at least one reinforcement layer comprises the third material.

3. The method of claim 1 wherein the at least one lightning strike protection strip is wider than the at least one reinforcement layer.

4. The method of claim 1 wherein the at least one lightning strike protection strip is narrower than the at least one reinforcement layer.

5. The method of claim 1 wherein the applying the at least one lightning strike protection strip comprises applying a plurality of lightning strike protection strips in which at least one of the plurality of lightning strike protection strips overlaps another at least one of the plurality of lightning strike protection strips.

6. The method of claim 1 wherein the applying the at least one lightning strike protection strip comprises applying a plurality of lightning strike protection strips in which an edge of at least one of the plurality of lightning strike protection strips is spaced-apart from an edge of a different one of the plurality of lightning strike protection strips.

7. The method of claim 1 wherein the receiving the at least one lightning strike protection strip comprises receiving the at least one reinforcement layer disposed on a release sheet.

8. The method of claim 1 further comprising applying a surfacing layer over the lightning strike protection strip.

9. The method of claim 1 wherein the lightning strike protection strip is operable to provide a conductive pathway to dissipate the energy of a lightning strike in the structure.

10. The method of claim 1 wherein:
the receiving the at least one lightning strike protection strip disposed on the at least one reinforcement layer comprises receiving the at least one lightning strike protection strip disposed on the at least one reinforcement layer with an isolation layer disposed between the at least one lightning strike protection strip and the at least one reinforcement layer;
the automatically applying comprises automatically applying the at least one lightning strike protection strip disposed on the at least one reinforcement layer with an isolation layer disposed between the at least one lightning strike protection strip and the at least one reinforcement layer onto the at least one structural layer; and
the forming comprises forming the at least one structural layer, the at least one lightning strike protection strip, the isolation layer, and the at least one reinforcement layer, into the structure.

11. A structure formed using the method of claim 1.

12. A structure formed using the method of claim 10.

13. A lightning strike protection means for use in automatically forming a structure having lightning strike protection, said lightning strike protection means comprising:
a reinforcement layer comprising a unidirectional fiber reinforced composite tape;
a lightning strike protection strip disposed on said reinforcement layer, said lightning strike protection strip comprising a first material, and said reinforcement layer comprising a second material different from said first material;
wherein said reinforcement layer and said lightning strike protection strip are operable to being automatically applied using at least one of a fiber placement apparatus, a tape laying apparatus, and similar automated manufacturing means, and said reinforcement layer supporting said lightning strike protection strip and ensuring that tensile stresses are borne by said reinforcement layer to minimize stresses on said lightning strike protection strip during the automatically applying of said lightning strike protection strip disposed on said reinforcement layer and to avoid damage to said lightning strike protection strip; and
wherein said reinforcement layer forms a portion of the structure.

14. The lightning strike protection means of claim 13 wherein said reinforcement layer comprises fibers comprising at least one of graphite, fiberglass, and aramid, linear polyolefin, ceramic, and metal.

15. The lightning strike protection means of claim 13 wherein said lightning strike protection strip comprises a thickness of about 0.0035 inch, and said reinforcement layer comprises a thickness of about 0.005 inch.

16. The lightning strike protection means of claim 13 wherein said lightning strike protection strip is wider than said reinforcement layer.

17. The lightning strike protection means of claim 13 wherein said lightning strike protection strip is narrower than said reinforcement layer.

18. The lightning strike protection means of claim 13 wherein said lightning strike protection means is operable so that said lighting strike protection strip provides a conductive pathway to dissipate the energy of a lightning strike in the structure.

19. The lightning strike protection means of claim 13 further comprising an isolation layer disposed between said lightning strike protection strip and said reinforcement layer.

20. A structure comprising said lightning strike protection means of claim 13.

21. A method for forming a structure having lightning strike protection, the method comprising:
receiving at least one structural layer;
receiving at least one lightning strike protection strip disposed on at least one reinforcement layer, the at least one lightning strike protection strip comprising a first material, and the at least one reinforcement layer comprising a second material different from the first material;
automatically applying the at least one lightning strike protection strip disposed on the at least one reinforcement layer onto the at least one structural layer;
separately applying a surfacing layer over the lightning strike protection strip disposed on the at least one reinforcement layer disposed on the at least one structural layer; and
forming the at least one structural layer, the lightning strike protection strip, the reinforcement layer, and the surfacing layer into the structure.

22. The method of claim 21 wherein the surfacing layer comprise a first color and the lightning strike protection strip comprises a second color different from the first color.

* * * * *